W. Sims,
Refrigerator.
No. 305. A.I. Patented Feb. 8. 1859.
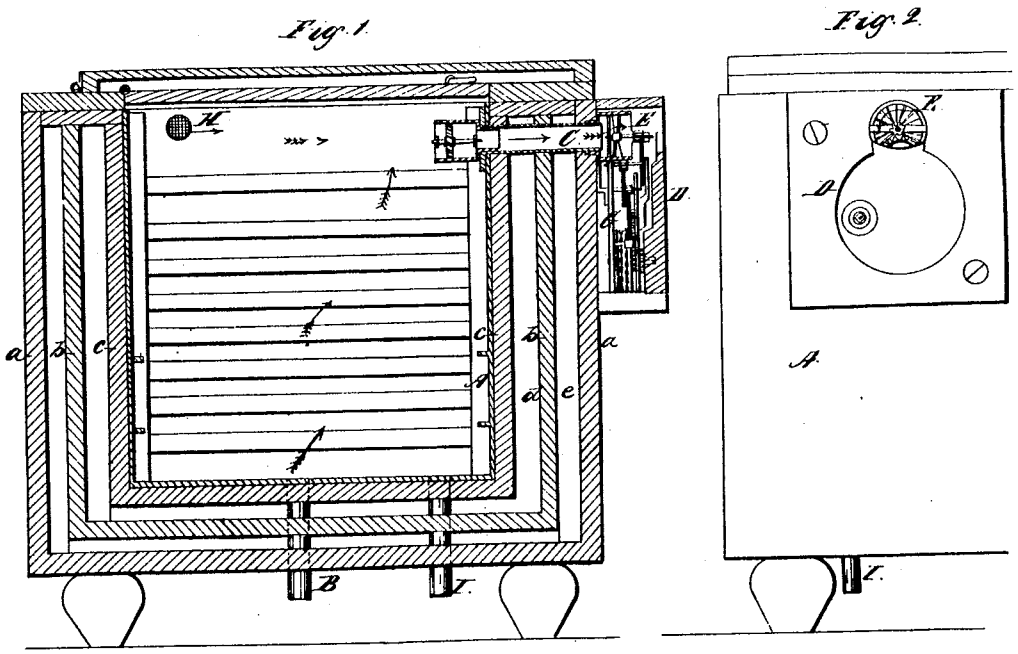
Witnesses:
F. H. Rudd
M. M. Crompton
Inventor:
W. Sims
N. PETERS, PHOTO-LITHOGRAPHER, WASHINGTON, D. C.